United States Patent [19]

Stock

[11] 4,009,535
[45] Mar. 1, 1977

[54] ILLUMINATED HOUSE NUMBER SIGN

[76] Inventor: William Stock, 172 High Park Ave., Ontario, Canada

[22] Filed: Oct. 1, 1975

[21] Appl. No.: 618,316

[52] U.S. Cl. .............................. 40/130 K; 136/89 R
[51] Int. Cl.² ........................................ G09F 13/00
[58] Field of Search ......... 40/130 K, 130 R, 132 R; 240/25, 6.4 R, 41.1; 60/641; 250/206, 214; 136/89, 89.05

[56] References Cited

UNITED STATES PATENTS

| | | | |
|---|---|---|---|
| 2,635,681 | 4/1953 | Hiltman et al. | 40/130 K X |
| 2,780,765 | 2/1957 | Chapin et al. | 136/89.05 X |
| 2,889,490 | 6/1959 | Paradise | 136/89 X |
| 3,521,047 | 7/1970 | Smith | 240/25 X |
| 3,864,861 | 2/1975 | Hill, Jr. | 40/130 R X |

OTHER PUBLICATIONS

"Photoelectric Generators for Navigational Beacons" by N. Pulmanov et al., pp. 12–15 in Applied Solar Energy, Allerton Press, NY (1974).

*Primary Examiner*—G.E. McNeill
*Assistant Examiner*—John H. Wolff

[57] ABSTRACT

A self contained house number sign which charges an internal battery from photo-voltaic cells during daylight. The battery is connected to a lamp via a phototransistor for energizing the lamp at night. The lamp edge lights a plastic template having cutout house number indicia.

2 Claims, 3 Drawing Figures

ILLUMINATED HOUSE NUMBER SIGN

FIELD OF THE INVENTION

The present invention relates generally to signs for storing solar energy which illuminates the sign at night. In its particular aspects, the present invention relates to a sign having a battery charged by a photo-voltaic cell.

BACKGROUND OF THE INVENTION

When travelling at night to an unfamiliar place often there is not enough light to see street signs, house number signs and the like. While signs have heretofore been fashioned of retroflective elements or have been illuminated by lamps, to my knowledge no illuminated sign has heretofore been known which is self contained, maintenance free and which can be illuminated throughout the night.

OBJECTS OF THE INVENTION

It is an object of the present invention to provide a self-contained sign which is capable of storing sufficient solar energy in daylight to light the sign substantially throughout the night.

It is a further object of the present invention to provide an illuminated sign having a separate indicia portion which is easily removed and replaced.

SUMMARY OF THE INVENTION

Briefly, the aforementioned and other objects of the present invention are satisfied by providing a plurality of photovoltaic cells on a top surface of a sign and a battery within the sign coupled to be charged during daylight from the photovoltaic cell.

During the night the battery energizes a lamp for lighting a sign portion. The sign portion, for easy replacement, comprises a sheet of translucent plastic, having cutout indicia. The sheet is edge lit by the lamp.

Other objects, features and advantages of the present invention will become apparent upon perusal of the following detailed description thereof when taken in conjunction with the appended drawing wherein.

DETAILED DESCRIPTION

Figure 1:
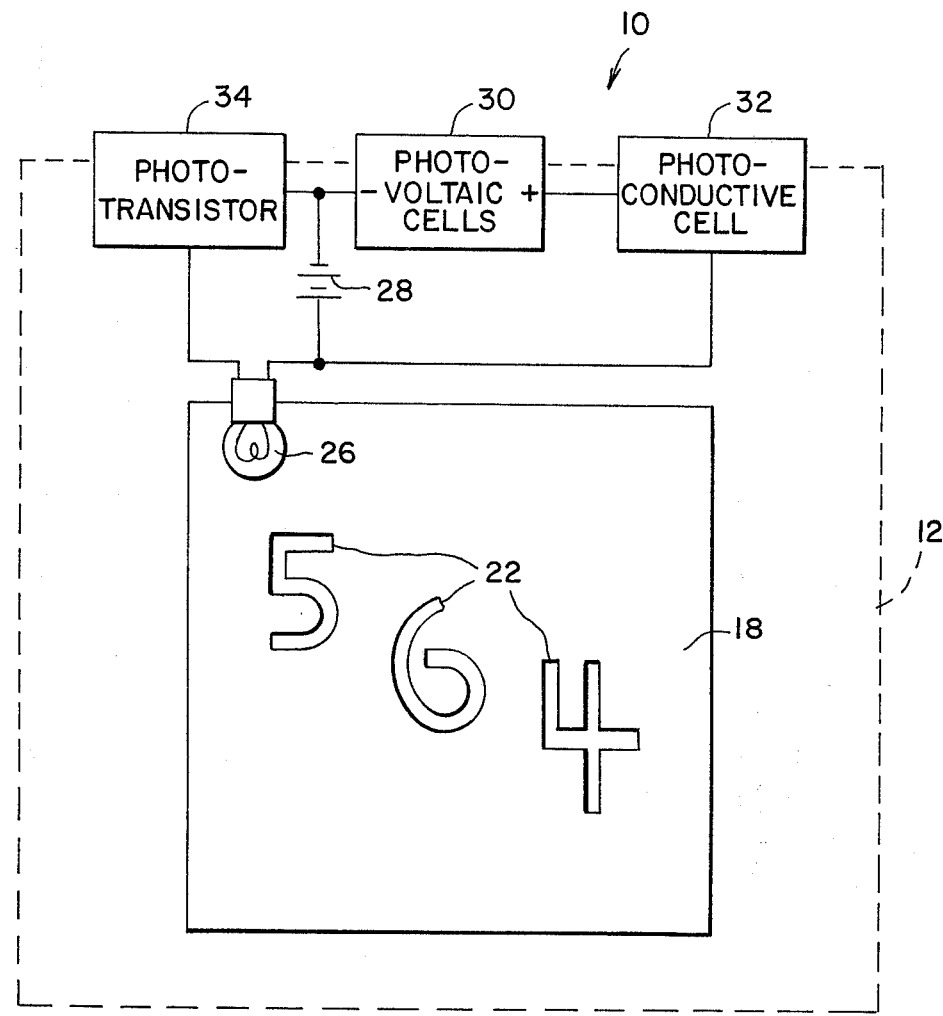
FIG. 1 is a schematic view of the sign of the present invention.
Figure 2:
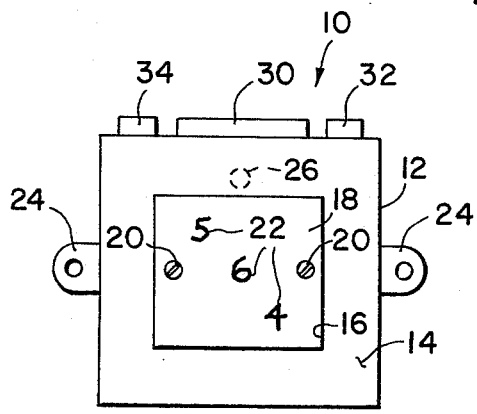
FIG. 2 is a front view similar to FIG. 1.
Figure 3:
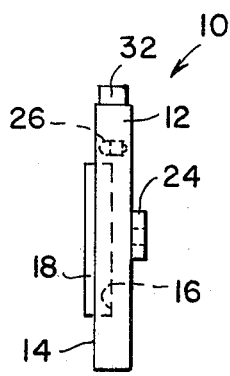
FIG. 3 is a side view of FIG. 2.

Referring to FIGS. 1 through 3 of the drawing, the illuminated sign of the present invention 10 comprises a rectangular housing 12 having a front face 14. On face 14 there is a rectangular recess 16 in which is set a sheet 18 of transluscent plastic having a high refractive index such as available under the trademark Lucite and Plexiglass. Sheet 18, which is secured in recess 16 by screws 20, has cutout number indicia 22 thereon which may be representative of a house number. As is apparent, sheets 18 may be separately available for fitting into a standardized housing 12. For mounting sign 10, on a building or other location, a pair of apertured ears 24 are provided projecting from opposite sides of housing 12.

A lamp or bulb 26, is located within housing 12 and is positioned along a top edge of sheet 18 for edge lighting the sheet to cause light to emanate from the contours defining cutout number indicia 22. Lamp 26 is positioned preferably as in FIG. 2, the position of the lamp in FIG. 1 being intended as schematic only.

As will be understood as the discussion proceeds, the lamp 26 is energized only at night from a battery 28 located within housing 12. In daylight, the battery 28 is charged from a series of photo-voltaic cells located along the top edge of housing 12. Alongside photo-voltaic cells 30, there is provided a photo-conductive cell 32 which is connected in a series circuit with photovoltaic cells 30 and battery 28.

Thus, in daylight, cells 30 produce a voltage which is applied to battery 28 via cell 32 which is rendered conductive by solar illumination impinging thereon. Battery 28 charges through the daylight hours and when the sun sets, cell 32 is rendered non-conductive disconnecting the battery 28 from the photo-voltaic cells 30.

A second series circuit is provided consisting of a photo-transistor 34, positioned alongside cells 30, connected electrically between lamp 26 and battery 28. The photo-transistor 34 is of a known inverting type which is conductive in the absence of illumination. Thus, during daylight hours, the battery 28 is disconnected from lamp 26 allowing the battery to be charged. When the sun sets causing the battery to be no longer in a charging condition, the photo-transistor 34 connects the battery to lamp 26 to light indicia 22.

It should be appreciated that the lamp 26 need only be energized by about five watts of power to provide sufficient light, and that cells 30 for supplying approximately that power level to the battery 28, and rechargeable batteries capable of storing approximately sixty watt-hours of energy are available and sufficiently small to be utilized for the purpose herein described.

Having described in detail the preferred embodiment of the present invention, it should be apparent that numerous modifications, additions, and omissions in the details thereof are possible within the intended spirit and scope of the invention.

What is claimed is:

1. A self contained illuminated house number sign which stores solar energy in daylight and utilizes the stored energy for night illumination comprising photovoltaic cell means, battery means, photoconductive cell means for coupling said photovoltaic cell means to said battery means only during daylight, lamp means, light sensing means for coupling said battery means to said lamp means at night, sign means positioned to be illuminated by said lamp means, and wherein said light sensing means is a photo transistor.

2. The sign of claim 1 wherein said sign means is a transluscent plastic template which is positioned to be edgelit by said lamp means.

* * * * *